United States Patent [19]

Forssell

[11] 4,207,509
[45] Jun. 10, 1980

[54] CONVERTER MOTOR

[76] Inventor: Harry Forssell, Kvarnängsvägen 20, S-180 10 Enebyberg, Sweden

[21] Appl. No.: 513,594

[22] Filed: Oct. 10, 1974

Related U.S. Application Data

[63] Continuation of Ser. No. 351,450, Apr. 16, 1973, abandoned.

[51] Int. Cl.² .............................................. H02P 5/16
[52] U.S. Cl. ................................................... 318/798
[58] Field of Search ............... 318/227, 230, 231, 798, 318/802–803

[56] References Cited

U.S. PATENT DOCUMENTS

| | | | |
|---|---|---|---|
| 3,512,067 | 5/1970 | Landau | 318/231 X |
| 3,593,083 | 7/1971 | Blaschke | 318/227 |
| 3,824,437 | 7/1974 | Blaschke | 318/227 |

*Primary Examiner*—Gene Z. Rubinson
*Attorney, Agent, or Firm*—Watson, Cole, Grindle & Watson

[57] ABSTRACT

An AC motor assembly includes a multi-phase AC motor driven by a static converter composed of a plurality of controlled rectifiers connected to a control device which transmits the control pulses in a given commutation sequence to the different rectifiers through a step switch. The step switch is controlled by a signal from an arrangement which measures the magnetic flux of the motor. This arrangement derives a parameter corresponding to the value of the magnetic main flux of the motor which at any moment is higher in any direction within the motor. This parameter controls through a summation device provided with a reference signal a discriminator which emits a signal to the step switch for switching the control device when the parameter exceeds a given reference value.

5 Claims, 4 Drawing Figures

CONVERTER MOTOR

This is a continuation of application Ser. No. 351,450, filed Apr. 16, 1973, now abandoned.

BACKGROUND OF THE INVENTION

1. Field of the Invention

The present invention relates to a converter motor, which is an AC motor assembly comprising a multiphase AC motor of induction type operated by a static converter.

2. The Prior Art

Since static converters in modern times have displayed a rapid development particularly after the introduction of controlled semiconductor rectifiers, thyristors, for high powers, there has been an increasing interest in converter operation of motors of various kinds and sizes. This applies above all to asynchronous motors, which offer an extremely simplified alternative to AC motors and synchronous motors. Many different systems are already known for operation of asynchronous motors at various speeds. It is, however, a problem to achieve stable and simultaneously optimum operating conditions at varying speeds as may occur, for example, in the case of traction and crane operation.

It is desirable in this connection to be able to increase or reduce the speed rapidly while maintaining a maximum torque, which may be fixed at a given limit, and in this way make sure that the change of frequency never becomes so great that the resulting slip results in an unstable torque curve. The problems here are, among other things, constantly to measure and control the torque and the slip, which is inconvenient when it is a question of controlling and regulating purposes and the conditions are not stationary.

SUMMARY OF THE INVENTION

The present invention will solve these problems and is based on a static converter with a control system comprising a control pulse device provided with some form of step switch to switch in the rectifiers of the static converter in accordance with a given commutation sequence.

According to the invention, the step switch is controlled in dependence of the magnetic flux of the motor so that, when this flux has reached a certain value, the reference value, the step switch is activated and the control pulse device is switched forward to the next control pulse combination. The use of the magnetic flux of the motor is known previously, per se, for controlling a feeding static converter, but in that case the value of the flux influences some kind of frequency control on the static converter, whereas according to the invention the value of the flux controls said step switch directly.

Thus the static converter will not be controlled with a prescribed frequency and accordingly a given duration on each switch step in the commutation sequence, but each switch step is maintained until the corresponding magnetic flux in the machine reaches a stipulated value. After this, the step switch is to switch in the next switch step.

Regulation of the motor speed is not performed by changing the converter frequency directly, but by changing other operative magnitudes involving an altered torque of the motor. The resultant alteration of the speed will, according to the principle of the invention, automatically involve a corresponding alteration of the converter frequency. An AC motor assembly according to the invention will thus be constituted by a multi-phase AC motor driven from a static converter which includes a number of controlled rectifiers connected to a control device. The control pulses from the control device are transmitted in a given commutation sequence to the different rectifiers through a step switch. An arrangement is provided for measuring the magnetic flux of the motor and emitting a signal corresponding to the value of the magnetic flux of the motor which at any moment is highest in any direction within the motor. This signal is supplied through a summation device which is also supplied with a reference value to a discriminator which emits a digital figure to the step switch for switching the control device 2 when the flux so measured exceeds a given reference value. By controlling the commutation in dependence on the magnitude of the magnetic flux of the motor, the frequency of the static converter will adjust itself corresponding to a certain slip. This will give the same stable condition as in the stationary case where the motor is driven with a constant speed from a network with constant voltage and frequency.

The type of static converter which may be considered depends to a certain extent on the power source in question. For stationary operation, crane operation and operation on rails, the normal power source is an AC network, in which case the static converter may be a direct frequency converter or a static converter with an intermediate DC link, that is the static converter comprises a rectifier, controlled or uncontrolled, and an inverter. For operation of vehicles the power source may be a battery, in which case the static converter will be a pure inverter. In this case and also when it is a question of the static converter with an intermediate DC link, the inverter must be of the self-commutated inverter type having circuits for forced commutation. The principle of the invention may, however, apply to any of these types of static converters, as will be apparent in the following.

The construction of the AC motor assembly according to the invention admits good possibilities of adjusting the torque of the motor as well as its speed, both in a varying speed and at stationary operation, so that the principle may apply to many different fields of use. Nor is it necessary to apply the invention only to three-phase asynchronous motors, but it may apply to other AC motors, for example linear motors, as long as they are multi-phase.

BRIEF DESCRIPTION OF THE DRAWINGS

In other respects the invention will be further described with reference to the accompanying drawing, in which FIG. 1 purely schematically shows a converter motor according to the invention, whereas

DESCRIPTION OF THE PREFERRED EMBODIMENTS

Figure 1:
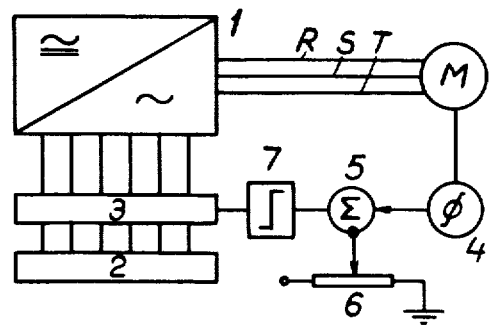

FIG. 1 shows a static converter 1 which has been indicated here by a general symbol for a converter the input side of which may be connected to a DC source or an AC source. The converter is connected to an asynchronous motor M and controlled by a control pulse device 2 connected to the rectifiers of the converter through a step switch 3 which, for example, may have the form of a ring counter. In the embodiment shown the control pulse device has six output terminals corresponding to six rectifiers in the converter, for example connected in a six-pulse bridge. The step switch 3 transmits the control pulses in the proper commutation sequence to the different rectifiers in the converter.

The step switch is controlled according to the invention in dependence on the flux growing up in the motor, which flux in FIG. 1 is purely symbolically measured by a flux meter 4, the output signal of which, as a measure of the instantaneous motor flux, is transmitted to a summation means 5. Also a reference value emitter for the motor flux is connected to said summation means, for example in the form of a potentiometer 6. The output terminal from the summation means 5 is connected to a discriminator 7, which transmits a signal to the step switch 3 when the signal from 5 passes zero, meaning that the motor flux in one direction has grown to the value set in the reference value emitter 6. The input signal to the step switch 3 results in a new control pulse combination to the rectifiers of the converter causing a commutation between the rectifiers. This means that the multiphase voltage fed from the converter to the motor M is thus switched forward by an angle corresponding to 360° :n, where n is the number of pulses of the converter. Because of this, the motor flux will grow up in a new direction until the reference value set in 6 has been reached, after which a new signal is emitted from the discriminator 7 to the step switch 3 with a resultant new commutation in the converter and switch of the multiphase voltage 360° :n and thus a new direction of the flux in the motor.

The magnetic flux of the motor may be measured inside the motor with the help of particular measuring coils of semiconductor elements, for example Hall elements. However, this is often rather inconvenient, particularly as it should be possible to the use the equipment according to the invention for simple asynchronous motors of standard type, which are not at all intended for such incisions in the construction.

It is considerably more simple and practical to start from the magnetizing current of the motor, which may be measured, or rather detected, by measuring and, for example, integrating the feeding voltage of the motor, or by detecting the growth of the magnetizing current in circuits corresponding to the motor.

Figure 2:
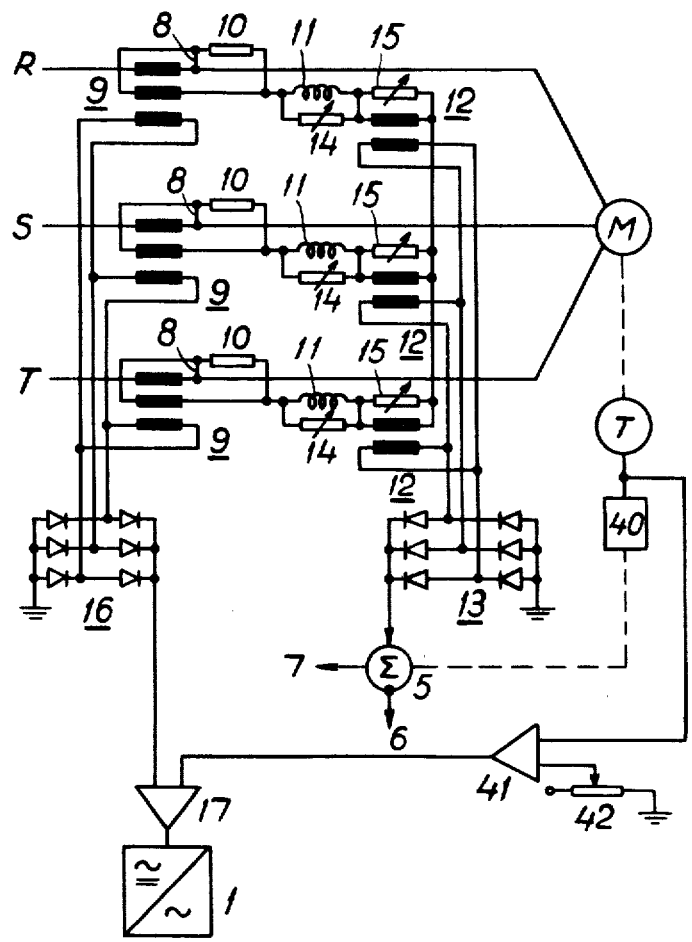
FIG. 2 shows in more detail one example of a control system for such a motor.

This can be carried out, for example, as shown in FIG. 2, which also shows a means for current regulation of the motor.

The feeding voltage of the motor may be taken from the phase conductors R, S, T between the converter 1 and the motor after correction for the voltage drop in the motor windings due to resistance and leakage inductance. In FIG. 2 the voltage is taken from terminals 8, and the correction for the voltage drop is made with the help of current transformers 9 mounted in the phase conductors and connected to impedances 10. The voltages are connected to reactors 11, and the current growing up in these reactors will, with a suitable dimensioning of the reactors, correspond to the magnetizing current growing up in the motor and thus the magnetic flux of the motor. The currents in the reactors 11 are measured by means of current transformers 12, the secondary sides of which are connected to a diode bridge 13. The signal from this bridge will thus become a measure of the growing magnetic flux of the motor, and this signal can be connected to the summation means 5. In this way the components 8–13 will correspond to the device 4 in FIG. 1.

It is important in this connection that the diode bridge 13 should correspond exactly to the rectifier bridge in the converter 1, both with regard to construction and phase sequence, so that the output signal from 13 at any moment is selected by the dominance connection of the diode bridge as the highest flux component of the motor. This is due to the fact that it is the actual value of the flux which is to determine if the step switch 3 is to be switched forward or not. In previously known constructions the frequency of a step switch of the same kind as 3 in the present application is regulated in dependence on the size of the deviation between the real value and the reference value of the flux, whereas, according to the invention, the signal from the discriminator 7 is a pure digital signal of the on-off type.

Figure 3:
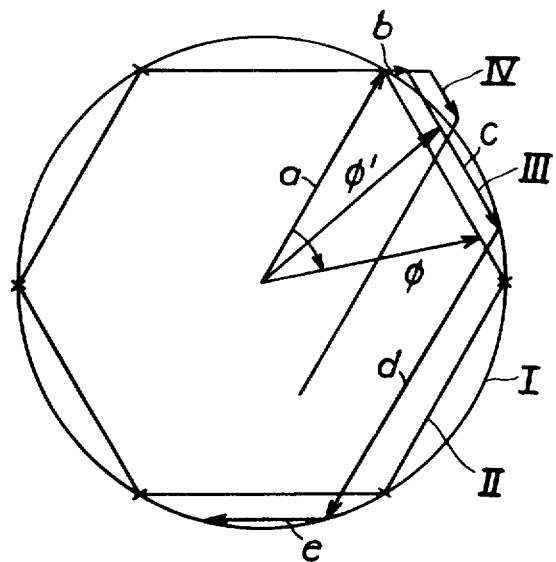
FIG. 3 shows the direction of the flux vector in the motor both at the start and in stationary operation.

The manner of action is most apparent by studying the variation of the flux vector $\phi$, as this has been indicated in FIG. 3.

Here the circle I indicates the reference value of the flux vector set in the potentiometer 6, whereas the regular hexagon II indicates how this flux vector varies during a period of the magnetizing current at stationary operation, that is according to a regular hexagon in the circle I.

The flux conditions are even more clear when regarding the growth of the flux vector according to the curve III at the start of the motor and the static converter. The flux vector $\phi'$ first grows up along the radius a until its value becomes equal to the radius of the circle I. Then the discriminator 7 will give a signal to the step switch 3 to commutate the static converter one step forward. The flux continues to grow, but now along the line b. The signal from 7 will therefore remain on the step switch 3 which continues to switch forward static converters at the rate indicated by the time constants in 1, 2 and 3 determining the highest commutation rate of the static converter 1. The flux vector $\phi'$ will then follow the line c and will quickly move inside the circle I, and the next commutation will not occur until the line c again intersects the circle I and is transformed into the line d and the next time into e. At a commutation rate which is still lower in relation to the growth of the flux, the flux vector would follow the curve IV.

It is seen that both curves III and IV deviate very strongly from the regular hexagon shape, which causes very irregular variations in the flux and accordingly the torque. This can be compensated by making the reference value from 6 dependent on the stepping rate. If the increased stepping rate at the transition b, c in the curve III involves an increase in the reference value, this means that the radius of circle I increases. Thus the transition between c and d will be moved so that these two lines approach the chord 60°.

As mentioned, the stepping rate of the step switch 3 is thus fully dependent on the digital signal from 7, which, in turn, is dependent on the value of the flux component which at any moment is highest in relation to the reference value set in 6. In this way it is made certain that the torque of the motor really is allowed to grow exactly to the desired value during each step before the next step is switched in.

The growth of the flux component, in turn, is dependent on the feeding voltage from the converter 1, which voltage may be varied in many ways, among other things by means of the current regulator 17 described below.

The rate of switching of the step device 3 may be made frequency dependent as mentioned, which can be obtained as shown in FIG. 2 by connecting the reactors 11 in parallel with resistors 14 which should suitably be variable so that the degree of frequency-dependence may be adjusted, that is the speed at which current in the current transformers 12 grows up in relation to the voltage from the terminals 8. Further, the current transformers 12 may be connected in parallel with variable resistors 15 to adjust the sensibility of these transformers.

Another form of frequency dependent control of the step switch 3 has been indicated in FIG. 2, namely with the help of tachometer generator T driven by the motor M and connected to the summation means 5 over a signal emitter 40, a frequency dependent signal being added to the actual and reference values of the motor flux which are fed to the summation means. Particularly in more simple equipment with asynchronous motors of standard type, the tachometer generator becomes an unreasonably complicated component compared to what may be achieved with the resistors 14. This signal is further rather uncertain at low speeds, for example at the start.

In FIG. 2 is also shown how the current transformers 9 may be provided with an extra secondary winding connected to a diode bridge 16. The signal from this bridge indicates a measure of the total current of the motor and can be used for current regulation of the motor, for example over a regulating amplifier 17 of a kind known per se, connected to the converter 1. Such regulation may comprise alternate blocking and deblocking of the static converter, so that the motor current is always kept within certain fixed limits. Especially with a low stepping frequency such current regulation is necessary in order to prevent the motor current from growing into a short-circuit before the step switch has time to switch over to the next step in the commutation sequence. The regulating amplifier may be connected to the converter 1 in a way which is most convenient for a given converter, for example depending on whether it is a direct converter or a converter with an intermediate DC link or possibly a pure inverter.

Also the regulating amplifier 17 may be made frequency-dependent by providing it with a reference value emitter in the form of a speed regulating amplifier 41, to the input side of which the actual value of the speed, in the form of signals from the tachometer generator T, and the reference value of the speed are connected, for example from a potentiometer 42. By altering the potentiometer 42, the signal from 41 is altered, the current regulator 17 thus altering the motor current and the motor torque until the speed corresponds to the desired speed value.

In this way, the speed and the torque may be increased up to the maximally allowed current of the equipment. Further increase in speed may be achieved by reducing the reference value set in the potentiometer 6, so that the level of flux for switching the step switch 3 is reduced, which means that the stepping rate increases.

A modified speed regulation is attained by selecting the function of the signal emitter 40 or by adjusting the resistors 14 and 15.

Figure 4:
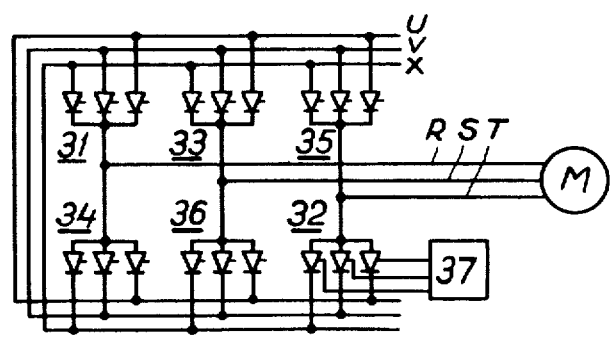
FIG. 4 shows a direct static converter intended for regulation according to the invention.

FIG. 4 shows a direct converter for feeding the motor M from an AC network UVX. The converter consists of six rectifier groups 31-36, each one with a control pulse device 37, only one of which has been shown. These rectifier groups are deblocked and blocked in the given commutation sequence by a step device corresponding to 3 in FIG. 1 and controlled, for example, as described in FIG. 2. During the conducting intervals each rectifier group works as a rectifier, and its current is controlled by current regulators corresponding to 17 in FIG. 2. Also here the principles according to the invention may be applied.

It is clear that the invention provides good possibilities of regulation, because the different control parameters may be adjusted in relation to each other. In this connection, the current adjusted by the current regulator of the converter should suitably exceed the switching level for the magnetizing current of the motor in order to make sure that said current has time to grow up within a reasonable time. Further, the adjusting of the frequency-dependence, for example over the resistors 14 or the tachometer generator T, allows good possibilities of variation.

In addition to this, the equipment according to the invention allows a regenerative braking, in which case the converter is retarded so that it tends to reduce the stepping rate, which means that the motor runs above synchronism, that is with a negative slip and accordingly braking in the motor. Also this negative slip will be kept under control so that a well-defined, controlled braking of the motor is obtained.

I claim:

1. An adjustable AC motor assembly, comprising a polyphase AC motor (M) and a static converter (1) generating polyphase electric power for driving said motor; said static converter comprising a plurality of controlled rectifiers; a control pulse generator (2) for said controlled rectifiers; a step switch (3) between said control pulse generator and said controlled rectifiers for transmitting said control pulses to said rectifiers in a given commutation sequence; means (4) for sensing the magnetic main flux of said motor in different directions; said sensing means comprising signal means (8-12) for transforming the value of said flux into electric signals and selecting means (13) for selecting at any moment the signal indicating the highest flux value in the different directions within the motor; a discriminator (5,7) and threshold value means (6) setting a certain reference value connected to said discriminator; said discriminator including means to give an output signal of an on-off type when said flux value signal exceeds said reference value; said discriminator being connected to said step switch to activate the step switch in response to such output signal.

2. Adjustable AC motor assembly according to claim 1, in which one of said sensing means (4) and said discriminator (7) is adjustable to vary the stepping rate of the step switch.

3. Adjustable AC motor assembly according to claim 1, in which one of said sensing means (4) and said discriminator (7) is adjustable in dependence on the desired torque or speed of the motor.

4. Adjustable AC motor assembly according to claim 1, in which said static converter comprises a current regulator (17).

5. Adjustable AC motor assembly according to claim 4, in which said current regulator (17) operates in dependence on the desired torque or speed of the motor.

* * * * *